US012664754B2

(12) United States Patent
Wan et al.

(10) Patent No.: US 12,664,754 B2
(45) Date of Patent: Jun. 23, 2026

(54) DECODER USING OUT OF ORDER PROCESSING TO PROVIDE A DALTONIZED IMAGE

(71) Applicant: Avago Technologies International Sales Pte. Limited, Singapore (SG)

(72) Inventors: Wade K. Wan, Villa Park, CA (US); Darren Neuman, Palo Alto, CA (US); Richard Hayden Wyman, San Jose, CA (US); Brett J. Andrews, Huntington Beach, CA (US); Jason W. Herrick, San Jose, CA (US); David C. Wu, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 313 days.

(21) Appl. No.: 18/343,484

(22) Filed: Jun. 28, 2023

(65) Prior Publication Data

US 2024/0013508 A1     Jan. 11, 2024

Related U.S. Application Data

(60) Provisional application No. 63/359,437, filed on Jul. 8, 2022.

(51) Int. Cl.
*G06V 10/56* (2022.01)
*G06F 3/14* (2006.01)

(52) U.S. Cl.
CPC ............... *G06V 10/56* (2022.01); *G06F 3/14* (2013.01)

(58) Field of Classification Search
None
See application file for complete search history.

(56) References Cited

U.S. PATENT DOCUMENTS

| | | | | |
|---|---|---|---|---|
| 7,227,971 B2 * | 6/2007 | Nagao | ................ | H04N 7/17318 348/E7.071 |
| 2010/0284667 A1 * | 11/2010 | Yahata | ................. | G11B 27/034 386/E9.011 |
| 2012/0195503 A1 * | 8/2012 | Kim | .......................... | G06T 5/92 382/167 |
| 2014/0095600 A1 * | 4/2014 | Needham | .............. | H04L 65/403 709/204 |
| 2017/0301310 A1 * | 10/2017 | Bonnier | ................... | G09G 5/04 |
| 2018/0152721 A1 * | 5/2018 | Rusanovskyy | ........ | H04N 19/12 |
| 2018/0275814 A1 * | 9/2018 | Hosokawa | ................ | G06F 3/14 |
| 2019/0265942 A1 * | 8/2019 | Yoshimura | ............ | G06F 3/1415 |
| 2019/0354265 A1 * | 11/2019 | Winnemoeller | .... | G06F 3/04845 |

(Continued)

FOREIGN PATENT DOCUMENTS

WO     WO-2022055567 A1 *   3/2022   ........... G09B 21/008

*Primary Examiner* — Pawan Dhingra
(74) *Attorney, Agent, or Firm* — Foley & Lardner LLP

(57) ABSTRACT

Systems and methods are related to daltonizing images. An image decoder can receive a first image and a second image. The images can be associated with a first metadata and second metadata, respectively. The image decoder and determine a color mapping for the first image and the second image based on the first metadata and the second metadata. The image decoder can process the images in a color vision deficiency (CVD) processor and based on the images and their associated metadata generate daltonized images which are sent to a display.

20 Claims, 9 Drawing Sheets

(56)                    References Cited

U.S. PATENT DOCUMENTS

| 2023/0109439 | A1 * | 4/2023 | Tamir | H04N 21/8456 |
| | | | | 713/189 |
| 2023/0315275 | A1 * | 10/2023 | Morimoto | H04N 9/3182 |
| | | | | 715/761 |
| 2024/0073361 | A1 * | 2/2024 | Lee | H04N 7/141 |
| 2024/0329909 | A1 * | 10/2024 | Yoshida | B60K 35/80 |

* cited by examiner

900

DECODER USING OUT OF ORDER PROCESSING TO PROVIDE A DALTONIZED IMAGE

CROSS REFERENCE TO RELATED APPLICATIONS

This application claims the benefit and priority to U.S. Provisional Patent Application No. 63/359,437, filed on Jul. 8, 2022, the entire disclosure of which is hereby incorporated by reference herein.

BACKGROUND

This disclosure generally relates to processing and displaying images including but not limited to systems and methods for processing and displaying images for those with color vision deficiencies (CVD) (e.g., color blindness) or other visual deficiencies.

In recent years, as the creation and consumption of digital media (e.g., photos, videos, augmented reality, virtual reality, etc.) has rapidly increased, interest has also grown in ensuring the widest possible range of consumers can access it. Particularly, as it pertains to visual digital media, a substantial number of people have color vision deficiency (CVD), (e.g., color blindness), which can affect their consumption and enjoyment of visual digital media. There are techniques which modify the digital media (e.g., images) to allow a person with CVD to better distinguish discrete colors, but these techniques often disrupt the viewing experiences for others who do not have CVD or may have a different type of CVD and are viewing the same digital media.

BRIEF DESCRIPTION OF THE DRAWINGS

Various objects, characteristics, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
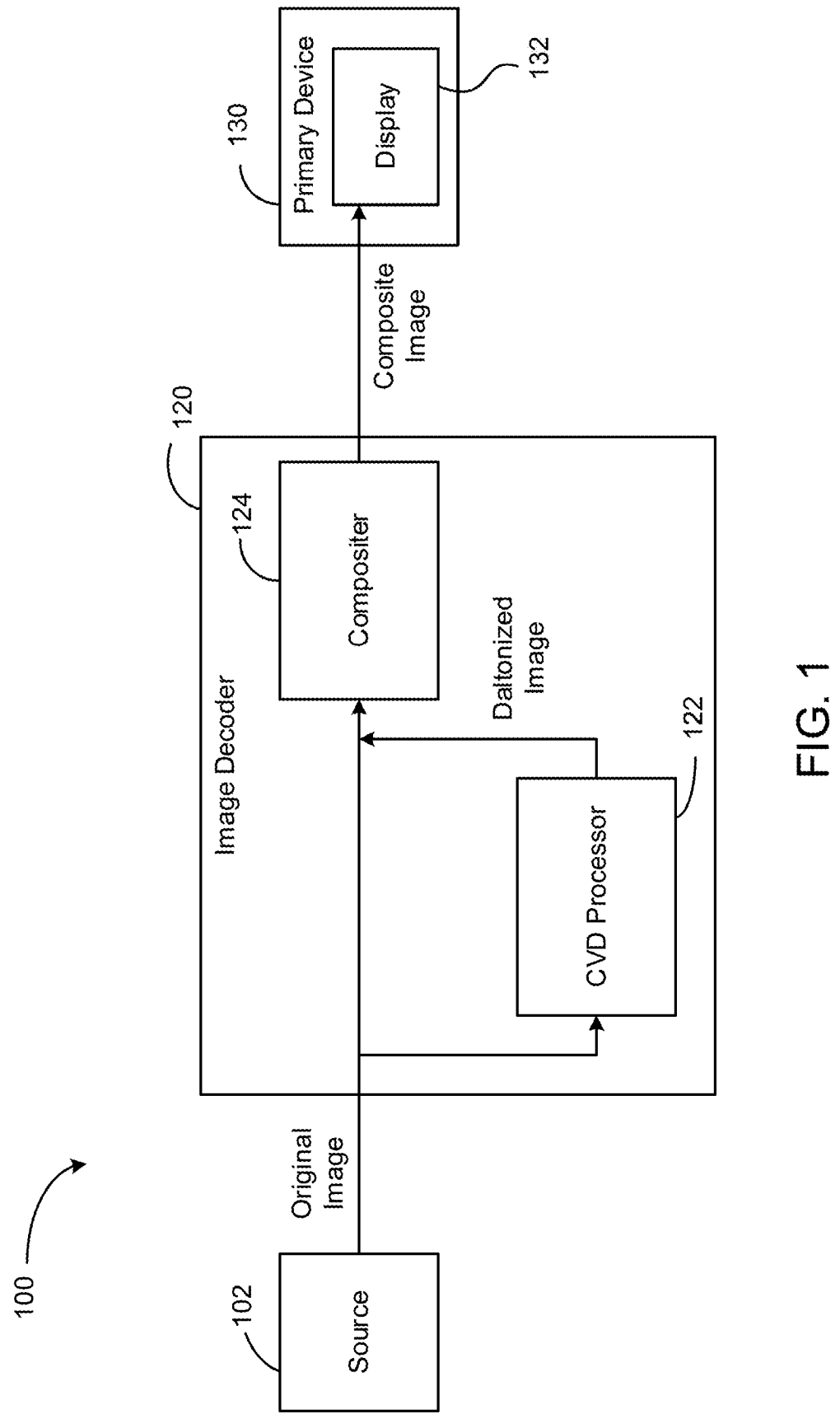
FIG. 1 is a block diagram of image processing in an example system including an image decoder and a display device, according to one or more embodiments.

The details of various embodiments of the methods and systems are set forth in the accompanying drawings and the description below.

DETAILED DESCRIPTION

While characteristics of the subject technology are described herein with reference to illustrative examples for particular applications, it should be understood that the subject technology is not limited to those particular applications. Those skilled in the art with access to the teachings provided herein will recognize additional modifications, applications, and characteristics within the scope thereof and additional fields in which the subject technology would be of significant utility.

Various embodiments disclosed herein are related to an electronic device. In some embodiments the electronic device is an image and/or video decoder (e.g., a set top box, a cable box, a television decoder, etc.), hereinafter referred to as in image decoder. An image decoder may refer to an electronic device which receives a compressed, encoded digital image/video and uncompresses and processes the image/video according to a codec to "decode" the image/video for display in some embodiments. An image may refer to a graphical image or video image and can be represented by data in some embodiments. A stream may refer to a video stream or sequence of images in some embodiments. A stream may be provided as digital data in a sequence of frames and may or may not include metadata in some embodiments. A stream can be compressed or uncompressed and encrypted and unencrypted. Metadata may refer to data that describes and gives information about other data in some embodiments. In some embodiments, the metadata includes information for providing a color map, such as a user selection of a color map.

In some embodiments, the image decoder receives an original image from a source, such as a video source (e.g., a feed from a cable television provider). In some embodiments, the image decoder modifies an image or video feed using one or more color correction techniques to adjust the colors of the image(s) in such that a way that an individual with color vision deficiency (CVD) is better able to distinguish discrete colors, i.e., "daltonize" the image(s). In some embodiments, the image decoder modifies an image or video by mapping some or all of the colors in the image/video to other colors or to monochrome. The modification thereby results in colors which are difficult to see for someone with CVD being changed to mapped colors (or monochrome) which are easier for an individual with CVD to discern. As used herein, the term "daltonize" may refer to any processing of an image designed to modify the image such that it is easier to view for those with CVD in some embodiments. In some embodiments, all of the colors in an image are modified. In some embodiments, a subset of the colors in an image are modified. In some embodiments, the image decoder provides both the original image and a processed "daltonized" copy of the original image to a display for presentation at the same time. In some embodiments, the image decoder provides the original image to a first display and the daltonized copy of the original image to a second display. In some embodiments, the image decoder provides the original image to a first and a second display, and one of the first or the second displays daltonizes the original image to generate a daltonized copy.

In some embodiments, an image can be associated with information/metadata to assist the image decoder and/or the one or more displays to process the image. In some embodiments, the image decoder determines an appropriate color mapping for an image based on the metadata. In some embodiments, the image decoder adjust the color mapping for a first image based on metadata indicating an appropriate color mapping for a group of images includes the first image. In some embodiments, the image decoder determines the color mapping for images based on information on the subject matter of the images, such as a specific teams sporting event, a type of sporting event, a title, a channel, a source, etc. In some embodiments, the image decoder receives a user input indicating an appropriate color mapping for an image. In some embodiments, the user input and/or the information on the subject matter of the images and the appropriate color mapping are stored for future use. The user input and/or the information can be stored on the image decoder or remotely (e.g., on a remote device, an external server, in the cloud, etc.).

Various embodiments disclosed herein relate to a method for adjusting the color mapping of a series of images based on metadata associated with the images. The method includes receiving a first image and its associated first metadata and determining a first color mapping for the first image based on the first metadata. The method also includes receiving a second image and associated second metadata and determining a second color mapping for the second image based on the second metadata.

In some embodiments, the first and second metadata include one or more identifiers (IDs), and each unique color mapping is associated with an ID. In some embodiments, the first and second images use the appropriate color mapping based on the associated IDs of the first and second images. In some embodiments, the color mappings and their associated IDs are stored such that the images can be decoded in a different order than the images are displayed.

Prior to discussing specific embodiments of the present solution, it can be helpful to describe characteristics of the operating environment as well as associated system components (e.g., hardware elements) in connection with the methods and systems described herein. Referring to FIG. 1, an embodiment of a system 100 is depicted. In brief overview, the system 100 includes a source of an original video or image, shown as source 102, an image decoder 120, and a primary device 130. The image decoder 120 can receive an original image from the source 102 and process the original image to generate a daltonized image, and both the original image and the daltonized image can be provided as a composite image to the primary device 130. The image decoder 120 can for example be an electronic device such as a set top box, a cable box, a television decoder, a laptop computer, a tablet, a personal computer, etc. The image decoder 120 can include a CVD processor 122 for daltonizing the original image and a compositer 124 for creating a composite image including the original image and the daltonized image. The primary device 130 receives the composite image, and can for example be an electronic device such as a television, a computer monitor, a laptop, a tablet, a projector, and/or some other type of display device. A display may refer to any type of display including but not limited to a display or monitor associated with any of the devices or systems discussed herein in some embodiments. A display may be part of a larger unit with additional displays or windows for displaying images. The details of a general embodiment of an electronic device such as the image decoder 120 and the primary device 130 are described in greater detail with reference to FIG. 10. The operating environment is exemplary. System 10 can be employed on an entertainment systems, computing system, simulators, gaming systems, televisions, set top boxes, smart televisions, smart phones, movie theatres, monitors, etc.

In some embodiments, the CVD processor 122 generates the daltonized image according to one or more color correction techniques. While commonly known as color blindness, color vision deficiency (CVD) is a condition which affects a person's perception of color, and often results in a diminished ability to differentiate amongst colors and differences in colors. CVD can be accommodated by color correction techniques which can adjust the colors in an image to increase the ability of a person with CVD to distinguish discrete colors. A color mapping can therefore be produced which maps colors a person with CVD may have a difficult time discerning with colors a person with CVD can more easily discern. The process of generating the color mapping is referred to herein as processing or "daltonizing" an image, and the resulting adjusted image is referred to herein as a "daltonized" image. There are many distinct and different types of CVD, such that a single color correction may only be appropriate for some types of CVD and not others. A color map may refer to data associated with colors in some embodiments. For example, a color map may be precomputed and stored in memory and may represent an array of colors in some embodiments. Color maps can be used to map pixel data for an image in some embodiments. For example, color mapping may use a color map to transform the colors of an image from one source into colors of a target image in some embodiments. In another example, a color map may be generated by real-time computation or processing in some embodiments.

In some embodiments, the image decoder 120 receives an original image (e.g., a single image, a video, etc.) from the source 102. In some embodiments, the image decoder 120 provides the original image to the CVD processor 122. In some embodiments, the CVD processor 122 uses one or more color correction techniques to daltonize a copy original image, thereby generating one or more daltonized images. In some embodiments, the CVD processor 122 selects from one of a plurality of color correction techniques based on metadata in the original image itself, a user input, a preset selection, etc. In some embodiments, multiple daltonized images are produced according to multiple color correction techniques to accommodate users with different types of CVD.

In some embodiments, the one or more daltonized image(s) are provided by the CVD processor 122 to a compositer 124. In some embodiments, the compositer 124 receives the original image and the daltonized copies of the original image and generates a composite image, known as a mosaic, which is then provided to the primary device 130 for display on display 132. In some embodiments, the composite image is a mosaic of the original image and single daltonized image. In some embodiments, the composite image is a mosaic of the original image and multiple daltonized images. Still in other embodiments, the composite image is a composite of one or more daltonized images but does not include the original image.

Figure 2:
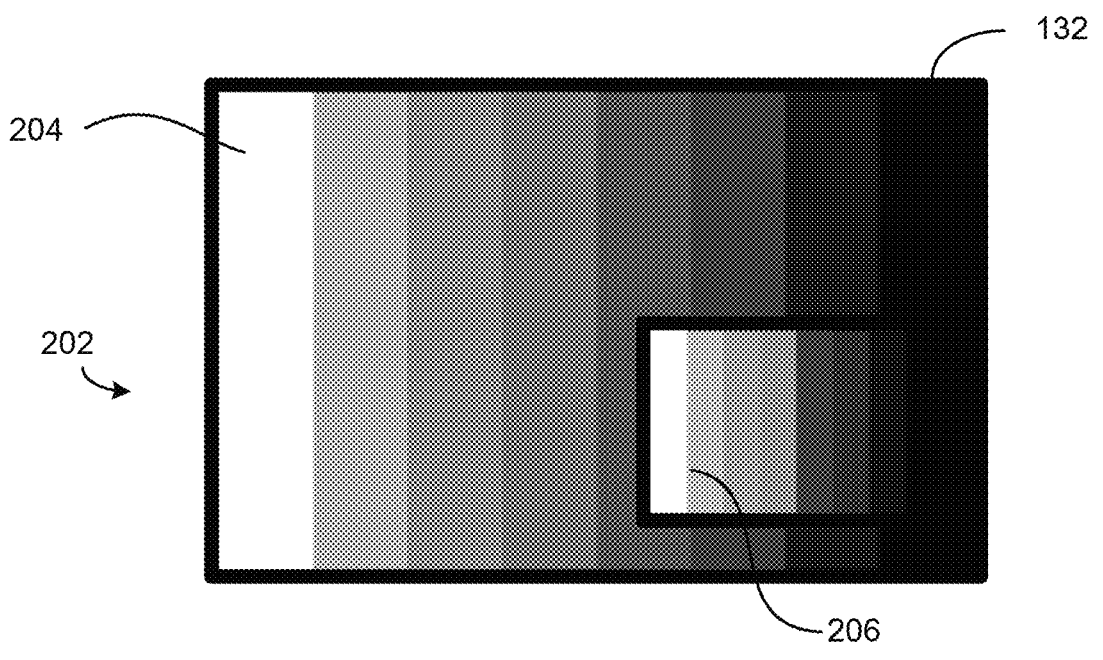
FIGS. 2 and 3 are illustrations of example arrangements of images on a display of a device within an example system, according to one or more embodiments.
Figure 3:
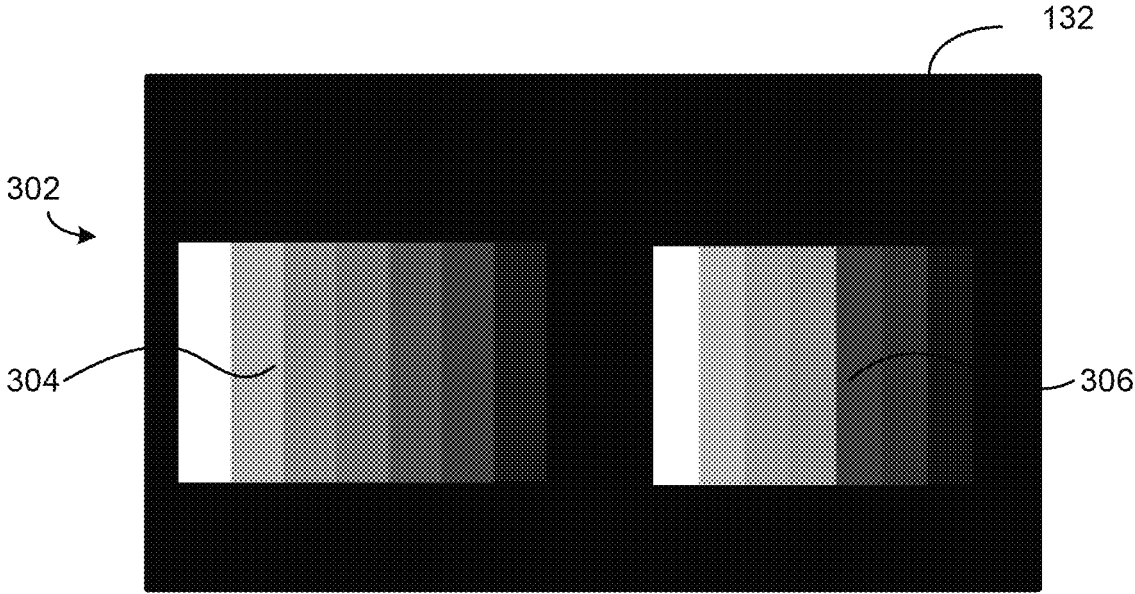

The compositer 124 can arrange the original image and/or the daltonized images in one or more different arrangements. For example, referring now to FIG. 2, the display 132 of primary device 130 is shown to display a composite image 202 as a Picture in Picture (PIP), wherein the daltonized image 206 is shown within a portion of the original image 204. While the daltonized image is shown in the lower right corner of the original image 204, it should be understood that the daltonized image 206 can be positioned anywhere within the original image 204. Further, the daltonized image 206 is shown with an example color mapping based on the original image 204, however as described above the specific color mapping and color associations in the daltonized image 206 can vary according to the selected color correction technique used by the CVD processor 122. For further example, referring now to FIG. 3, the compositer 124 can arrange the original image 304 and the daltonized image 306 in a Picture Outside of Picture (POP) arrangement. Although the original image 304 and the daltonized image 306 are shown as the same size, in some embodiments, the sizes of the images are not equal and may vary. It should also be understood that the position and size of the original image 304 and the daltonized image 306, as well as the number of discrete daltonized images, can vary without departing from the scope of the invention. For example, in a mosaic of the original image and three daltonized images, the composite image 302 can arrange the separate images in a 2×2 grid. Picture in picture may refer to a display mode where one image is provided within another larger image in some embodiments. Picture by picture may refer to a display mode where one image is provided next to another image or on the screen with another image with or without overlapping in some embodiments. Display modes can be used for video.

Figure 4:
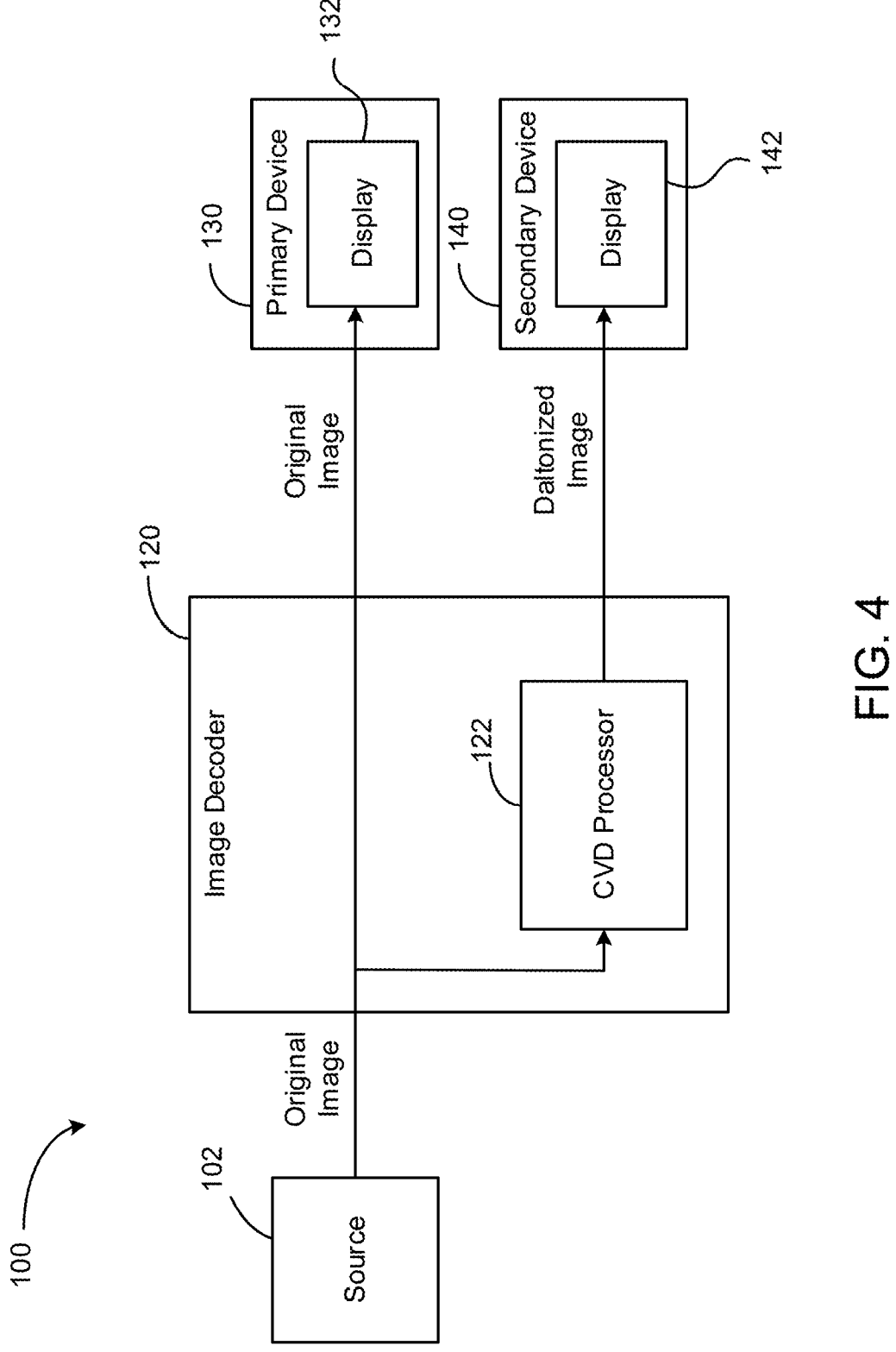
FIG. 4 is a block diagram of image processing within an example system including an image decoder and multiple display devices, according to one or more embodiments.

FIG. 4 depicts an embodiment of the system 100 in which the image decoder 120 is in communication with the primary device 130 and a secondary device 140. In such embodiments, the image decoder 120 can provide the original image to the primary device 130 while providing the daltonized image to the secondary device 140. In some embodiments, the original image and the daltonized image are provided simultaneously or substantially simultaneously to the primary device 130 and the secondary device 140, respectively. The CVD processor 122 can provide the daltonized image as a compressed or an uncompressed image to the secondary device 140. Substantially simultaneously may refer to an occurrence at approximately the same instance in time in some embodiments. For example, substantially simultaneously may be simultaneous with respect a perception of occurrence at the same time by a user even though a computing device performs the tasks serially in time. In embodiments, where the daltonized image is compressed, the image decoder 120 may reencode the daltonized image and the secondary device 140 may decode the daltonized image prior to displaying it on the display 142. In some embodiments, the primary device 130 and the secondary device 140 may each receive a daltonized image. The daltonized image for the primary device 130 may be generated according to a different color correction technique then the daltonized image provided to the secondary device 140. In some embodiments, there are additional devices to those shown, with each device receiving either an original image or daltonized image. In some embodiments, the image decoder 120 further includes the compositer 124 shown in FIG. 1, and one or more of the primary device 130 and the secondary device 140 can receive a composite image. For example, the primary device 130 can receive a composite image of the original image and a first daltonized image, while the secondary device 140 can receive a second daltonized image.

Figure 5:
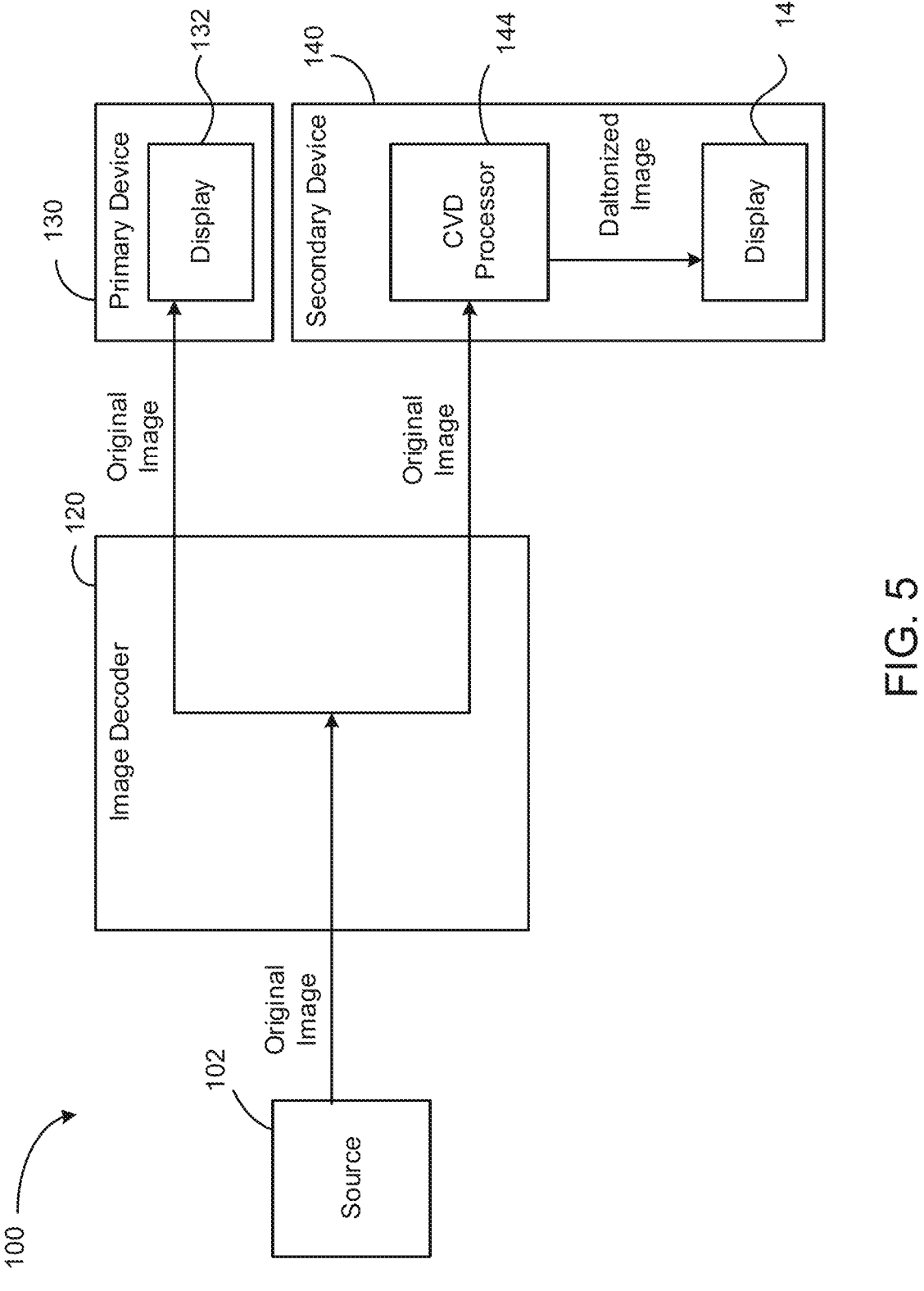
FIG. 5 is a block diagram of an example system including an image decoder and multiple display devices including image processing in the multiple display devices, according to one or more embodiments.

FIG. 5 depicts an embodiment of the system 100 in which the secondary device 140 connected to the image decoder 120 processes and generates the daltonized image itself. In such embodiments the secondary device 140 may include a CVD processor 144 which receives the original image from the image decoder 120, and generates a daltonized copy for display on the display 142. In some embodiments, the original image is provided to the secondary device 140 with metadata to assist with the CVD processing. The metadata can be supplemental enhancement information (SEI) appended to a video stream to convey extra information to the secondary device 140 for CVD processing. In some embodiments, the extra information includes the appropriate color mapping/color correction technique. In some embodiments, the image decoder 120 is removed and the primary device 130 and the secondary device 140 are connected directly to the source 102. In embodiments where the original image is compressed when provided to the secondary device 140, the compressed original image is first decompressed and then processed by the CVD processor 144. In embodiments where the original image is uncompressed when provided to the secondary device 140, the uncompressed original image can be passed immediately to the CVD processor 144. In some embodiments, the secondary device 140 further includes a compositer similar to compositer 124 shown in FIG. 1, such that the display 142 receives a composite image.

Figure 6:
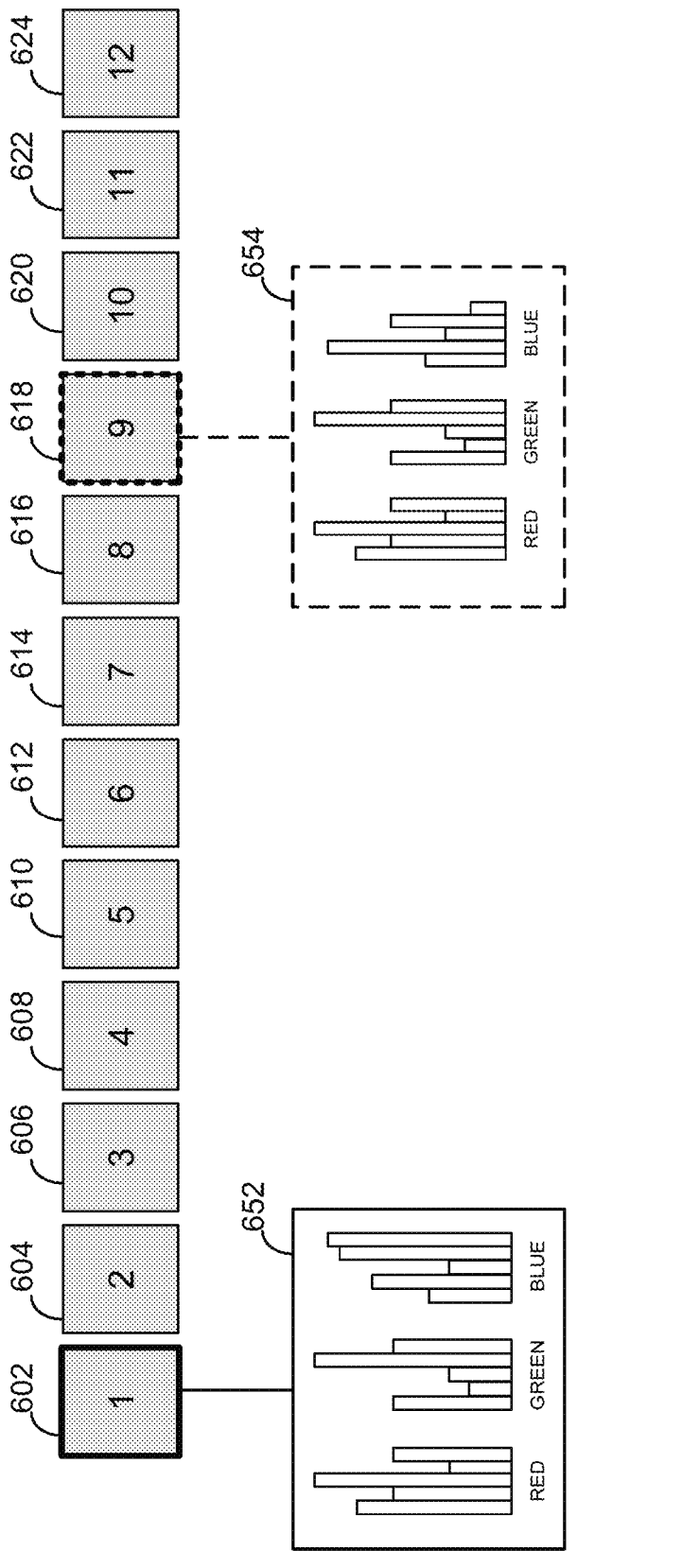
FIG. 6 is a block diagram of an example system for adjusting the color mapping of a video based on received metadata, according to one or more embodiments.

With reference to FIG. 6, the daltonized image can be generated according to a color mapping/color correction technique as indicated by or based on metadata included with the original images and/or metadata generated an electronic device analyzing the images (e.g., by the image decoder 120). Certain images and videos may use a color scheme or palette which conflicts with one or more color maps or color correction techniques. In some embodiments, the image can be daltonized (e.g., by image decoder 120) according to a color correction technique selected in view of the existing color scheme of the images to ensure the color correction technique that is used is suitable for that image or series of images. For example, a person with difficulty distinguishing red and orange may be accommodated by a color mapping where red is mapped to green and orange to blue. However, metadata may indicate the images include lots of green and/or blue, such that the color mapping conflicts with the color scheme of the image. A separate color mapping, such as mapping red to yellow and orange to purple, can then be selected based on the metadata to attempt to accommodate the user and the color scheme of the image/images. The metadata can be added to the image feed (e.g., video) such that it is included in the original image/video provided to the image decoder 120. For example, the metadata can be supplemental enhancement information (SEI) messages.

In some embodiments, the metadata is associated with a group of images, such that the group are processed according to the same color mapping based on the metadata. For example, videos often include scenes with identifiable color schemes. The images in a specific scene can include metadata indicating the color scheme of the entire scene, such that the proceeding images in the scene are all daltonized according to the same group metadata. When the video transitions to a new scene, new metadata accompanies the images in the new scene to indicate the new color scheme, and the color mapping can be updated en masse for the images in the new scene.

Still referring to FIG. 6, one or more images, shown as images 602-624 can be provided. In some embodiments, at least one of the images includes metadata. In some embodiments, the metadata is provided with the original image. In some embodiments, the original image is scanned (e.g., by the image decoder 120) to determine what colors are present in the image. For example in FIG. 6 image 602 is shown to include metadata 652. Metadata 652 includes a histogram of the colors in the image 602. In some embodiments, image 602 is daltonized based at least in part on the metadata 652. In some embodiments, the metadata 652 is used to daltonize multiple images. For example, the metadata 652 can be used to daltonize images 604-624. In some embodiments, the metadata 652 is used to daltonize the images after the metadata 652 is received until new metadata is received, shown as metadata 654 associated with image 608, after which a new color correction technique/color mapping is selected based on the metadata 654, and the new color mapping can be used for the proceeding images 618-624.

Figure 7:
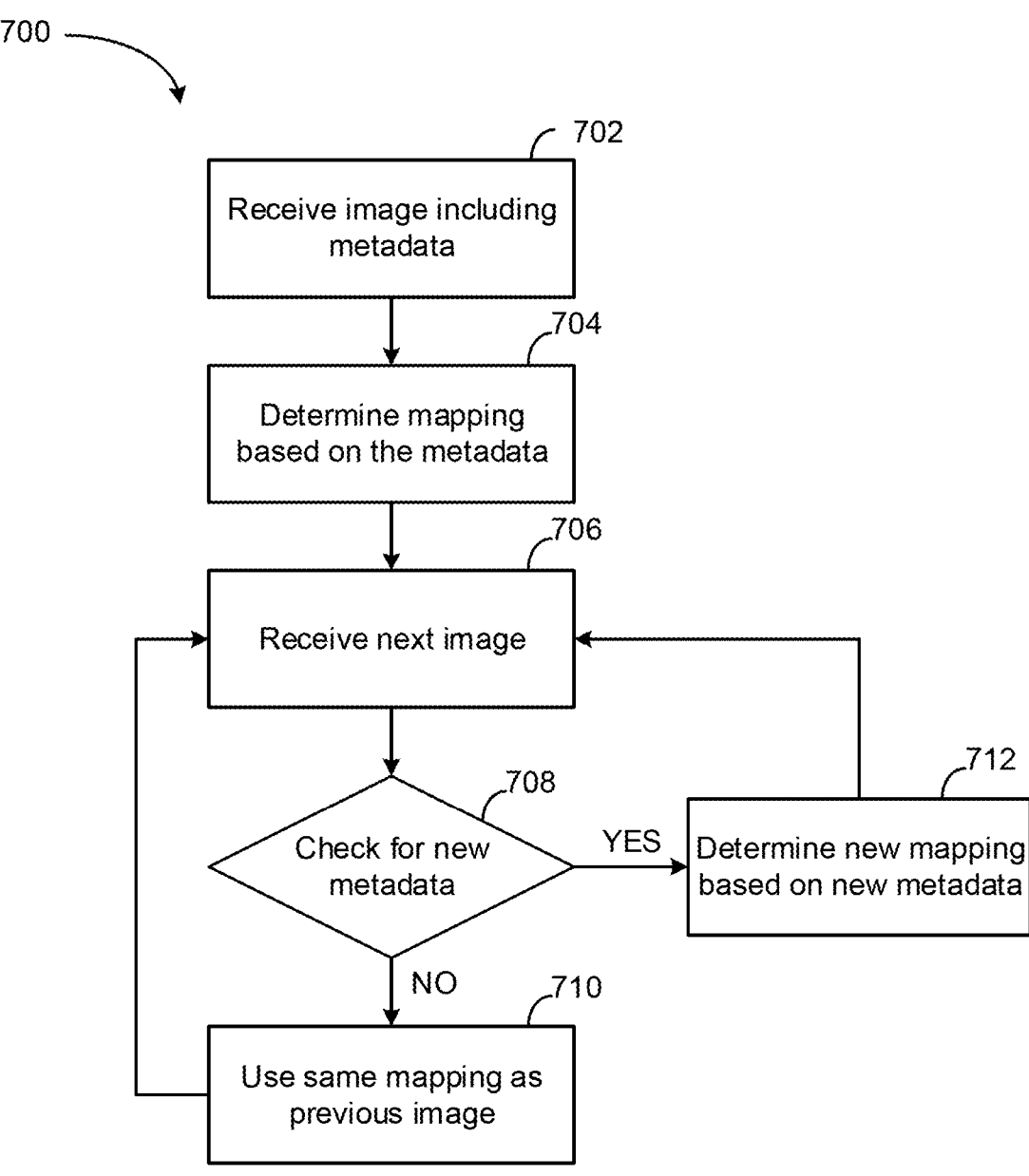
FIG. 7 is a flow chart of a process for adjusting the color mapping of a video based on received metadata, according to one or more embodiments.

FIG. 7 is a flow chart of a process 700 to adjust the color mapping of a video based on metadata, according to one or more embodiments. In some embodiments, the process 700 is performed by an electronic device (e.g., image decoder 120 shown in FIGS. 1 4, and 5). In some embodiments, the process 700 is performed by other entities. In some embodiments, the process 700 includes more, fewer, or different steps than shown in FIG. 7.

In some embodiments, at step 702 process 700 includes receiving an image including metadata. In some embodiments, the metadata is provided with the original image. In some embodiments, the metadata is added to the image by one or more electronic devices (e.g., the image decoder 120). At step 704, using the metadata the image decoder 120 determines the color mapping based on the metadata. At step 706, the image decoder 120 receives the next image.

In some embodiments, at step 708 the image decoder 120 checks the next image for new metadata. If the next image does not have new metadata (e.g., no metadata or the same metadata as the previous image), the process 700 proceeds to step 710 and the image decoder 120 continues to use the same color mapping/color correction technique and returns to step 706. If the next image does include new metadata, then the process 700 proceeds to step 712 and the image decoder 120 determines a new color mapping/color correction technique based on the new metadata and returns to step 706.

Figure 8:
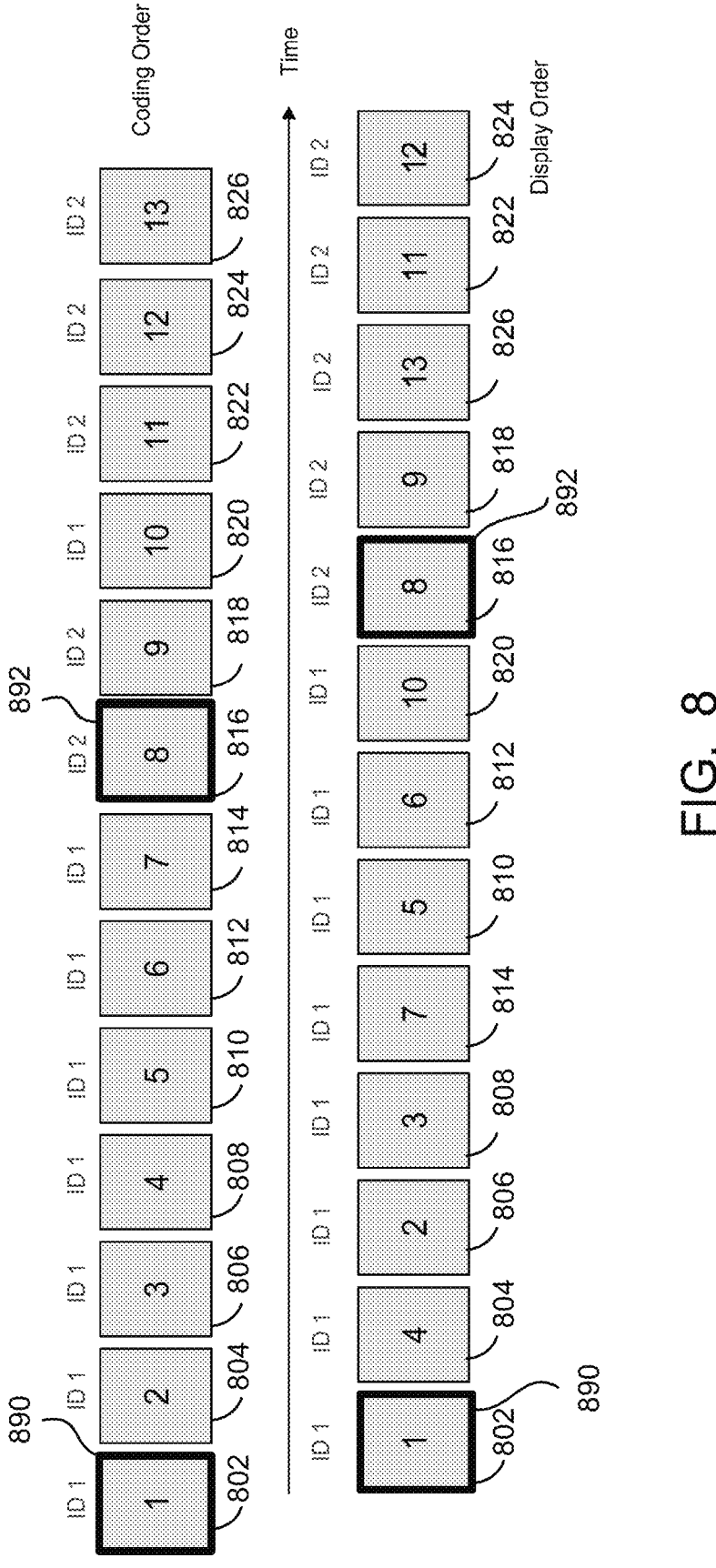
FIG. 8 is a block diagram of an example system for adjusting the color mapping of a video based on received metadata for images that are decoded in a different order than the images are displayed, according to one or more embodiments.

FIG. 8 depicts an embodiment wherein the images are coded and/or daltonized in a different order then the images are displayed. FIG. 8 includes images 802-826. Each image 802-826 is associated with an ID, shown as ID 1 or ID 2. The IDs can each represent specific instances of metadata. For example, the metadata represented by ID 1 can be for a first color scheme found in the images, and the metadata represented by ID 2 can be for a second color scheme found in the images. In some embodiments, the metadata is stored (e.g., in the image decoder 120) and is selectively retrieved per image based on the ID associated with the image. In some embodiments, images coded and/are daltonized in a coding order which is different form the order in which they will be displayed. For example, the images may be coded sequentially from 802 through 826. However in the display order shown in FIG. 8 the images 816 and 818 associated with ID 2 are coded before image 820 associated with ID 1, even though the images 802-826 are displayed in display order shown as {802, 804, 806, 808, 814, 810, 812, 820, 816, 818, 826, 822, 824} with image 820 displayed prior to images 816 and 818. To accommodate that multiple images which may use multiple color mappings but not be processed by color mapping in same order they are displayed, the metadata indicating the color mapping can be stored (e.g., in the image decoder 120). In such embodiments, when an image with an ID associated with a first instance of metadata is received, the first metadata can be retrieved and the image can be daltonized accordingly, and when an image with an ID associated with a second instance of metadata is received, the second metadata can be retried (e.g., from memory) and the image can be daltonized based on the second metadata.

Figure 9:
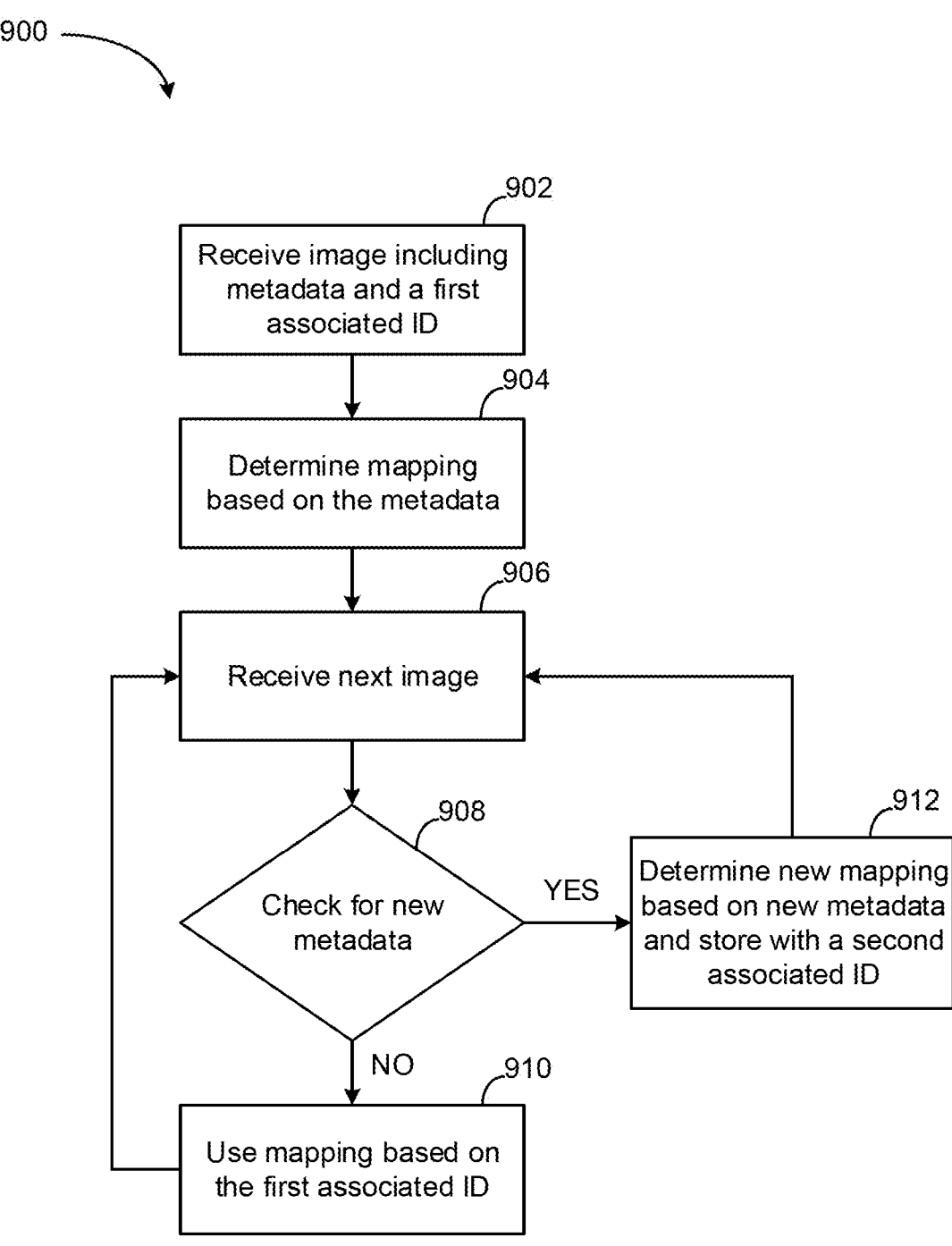
FIG. 9 is a flow chart of a process for adjusting the color mapping of a video based on received metadata for images that are decoded in a different order than the images are displayed, according to one or more embodiments.

FIG. 9 depicts a flow chart of a process 900 for processing images which are coded in an order that is different from which they are displayed. In some embodiments, the process 900 is performed by an electronic device (e.g., image decoder 120 shown in FIGS. 1 4, and 5, secondary device 140, etc.). In some embodiments, the process 900 is performed by other entities. In some embodiments, the process 700 includes more, fewer, or different steps than shown in FIG. 9.

In some embodiments, at step 902 process 900 includes receiving an image with metadata associated with a first ID. In some embodiments, the metadata and associated IDs are learned and stored as they are received. In some embodiments, the metadata and the IDs associated with various instances of the metadata are provided to the image decoder 120 prior to the processing of the images.

In some embodiments, at step 904 the image decoder 120 determines the color mapping based on the metadata. In some embodiments, at step 906 the image decoder 120 receives the next image. At step 908, process 900 includes checking the next image for new metadata. If there is no new metadata, process 900 is shown to proceed to step 910 and to use the color mapping based on the first associated ID. At step 908 if the next image does include new metadata, process 900 proceeds to step 912 and determines a new mapping based on the new metadata and stores new mapping/metadata based on an associated ID included in the next image. For example, the first metadata may be associated with a first ID. The next image can include second metadata associated with a second ID. The first metadata can be used to generate a first color mapping that is stored with the associated first ID, and the second metadata can be used to generate a second color mapping that is stored with the associated second ID. A third image can be received and be associated with the first ID, such that it is thereafter processing according to the first color mapping.

In some embodiments, the metadata is customized by one or more users. For example, a user can provide to the system (e.g., the image decoder 120) information such as the type of CVD the user has, the user's preferred color mapping technique, a preferred color map, etc., which can be stored in the metadata of an image to customize the daltonized image. In some embodiments, the user's preferences can be based on and/or associated with one or more characteristics of the images themselves, and can be stored and applied to future images sharing the same characteristics. The characteristics can include, in addition to the colors within the images, the subject matter, the type, the title, the source channel, the source, the time of day, etc. In some embodiments, the characteristics can themselves be included in metadata associated with the original images (i.e., metadata can indicate the subject matter of the images, the source, etc.). In some embodiments, an example image for a video can be provided to a user for customization. The example image can include common colors/objects for important parts of the video. The relevant parts can be common foreground objects (e.g., team jerseys, character colors, objects, etc.), backgrounds (e.g., fields, courts, rinks, skies, rooms, buildings, etc.), or principle objects (e.g., main characters, important thematic elements, etc.), amongst others. In some embodiments, the metadata included with the video and/or the video itself can be analyzed (e.g., by the image decoder 120) to generate the example image.

In some embodiments, a user can customize the example image based on the characteristics and the customization can be added to the metadata for the image/video. For example, the subject matter for a group of images may be a football game. A user can indicate (e.g., to the image decoder 120) via the example image that the user prefers the green of the football field to be mapped to red, and that preference can be included in the image metadata. For further example, a user can be a fan of a team with red jerseys. The user can indicate in the metadata that the red jerseys should be mapped to blue. As described above, in some embodiments the example image is displayed to a user illustrating the common colors (as indicated in the metadata) present in the video. This can include, for example, images of the teams' uniforms in a sporting event, images of a common background in a video, etc. A user can then indicate a preferred color mapping by customized the example image, indicating which colors should be mapped to which other colors (or monochrome) to fit the user's preferences. The user's inputs can then be saved and applied to the video, and to future images/videos, which share one or more common characteristics with the customized video. The preferences can be stored (e.g., on the image decoder, on a remote server, in the cloud, etc.), and the image decoder or another device with access to the preferences can process all future football games or team games according to the user's preferences to create a personalized, daltonized image.

In some embodiments, a user's preferences are saved and associated with one or more specific users. When later interacting with the image decoder 120, the image decoder 120 can determine the identity of the user and automatically retrieve the user's preferred CVD settings. In some embodiments, a user's preferences are associated with a user's digital profile in a digital streaming service. For example, upon selecting the user's profile in the digital streaming service, the images can be automatically adjusted to conform to the selected user's CVD preferences. In some embodiments, the digital streaming service adjust the color mapping of the images prior to transmitting them to the user. In some embodiments, the digital streaming service directs a local device, for example a local image decoder 120, to process the images based on the user's selected preferences. In some embodiments, the display device, (e.g., secondary device 140) processes the images according to the instructions from the digital streaming service.

Figure 10:
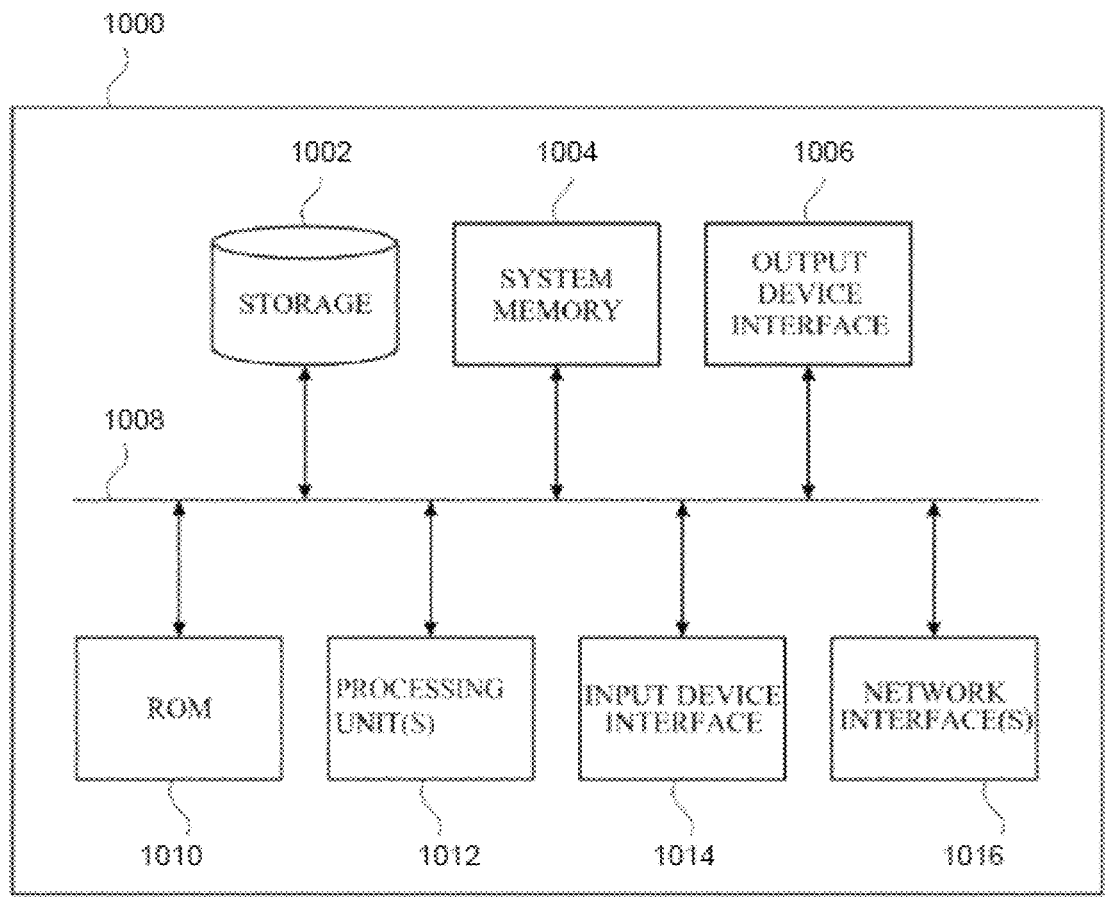
FIG. 10 illustrates an electronic system, according to one or more embodiments.

FIG. 10 illustrates an electronic system 1000 with which one or more implementations of the subject technology may be implemented. The electronic system 1000 can be, and/or can be a part of, the image decoder 120 shown in FIGS. 1, 4 and 5, the primary device 130, and the secondary device 140. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations. In some embodiments, the image decoder 120 is includes or is implemented by one or more processing unit(s) such as the one or more processing unit(s) 1012.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000, such as color mapping preferences for one or more images. Input devices that may be used with the input device interface 1014 may include, for example, alphanumeric keyboards and pointing devices (also called "cursor control devices"), touch screens, microphones, auxiliary devices, etc. The output device interface 1006 may enable, for example, the display of images generated by electronic system 1000, for example on primary device 130 and secondary device 140. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure. In some embodiments, the electronic system 1000 can receive information (e.g., original images, daltonized images, metadata, etc.) via the one or more networks.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature. The instructions may be executed on one or more processors.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, race-track memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Circuitry or circuit may refer to any electronic circuit or combination of circuits including but not limited to a processor, ASIC, programmable logic device or other hardware. To the extent that a device, circuit, processor or circuitry is described or recited in a claims as performing one or more operations or functions or as configured to perform to one or more operations or functions, the performance of the recited function(s) or operation(s) can be distributed across two or more devices, circuits, or processors without departing from the scope of the claims unless those functions or operations are explicitly recited as being performed on a specific single circuit or set of circuits, processor, or device (e.g., using the phrase "on a single circuit", "on the set of circuits comprising" or "on a single device").

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "image" and "video" both may refer to electronic representations of visual image(s) in some embodiments. The term "video" as used herein can refer to a series of multiple "images" in some embodiments.

As used in this specification and any claims of this application, the terms "set top box", "computer", "server", "processor", and "memory" all refer to electronic or other technological devices. These terms exclude people or groups of people. However, people or groups may interact with such devices. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some characteristics may refer to one or more characteristics and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various characteristics described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various characteristics described herein. Various modifications to these characteristics will be readily apparent to those skilled in the art, and the generic principles defined herein may be applied to other characteristics. Thus, the claims are not intended to be limited to the characteristics shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

14

What is claimed is:

1. A device comprising: an image decoder configured to receive a first data stream, the image decoder comprising a circuit configured to provide a first set of first daltonized images using a first color map and a second set of second daltonized images using a second color map using the first data stream, wherein the first set of the first daltonized images are processed before the second daltonized images, wherein at least one of the first set of the first daltonized images are located sequentially in time after a beginning of the second set of the second daltonized images, wherein the image decoder is configured to provide the first set of the first daltonized images and the second set of the second daltonized images for display on a first display communicably coupled to the image decoder, and to provide the first data stream for display on a second display communicably coupled to the image decoder, wherein the first daltonized images are indicated by an first identification and the second set of the second daltonized images are indicated by a second identification, wherein out of order processing of the first daltonized images and the second daltonized images is achieved using the first and second identifications.

2. The device of claim 1, wherein the first data stream comprises source data and metadata and the metadata is used to provide the first color map and the second color map.

3. The device of claim 2, wherein the metadata is embedded in the first data stream and is resolvable on a picture-by-picture basis.

4. The device of claim 2, wherein the first metadata designates a color map selected by a user as the first color map.

5. The device of claim 1, wherein the first color map is selected in response to a first color characteristic of a first set of first data stream images corresponding to the first daltonized images and the second color map is selected in response to a second color characteristic of a second set of data stream images corresponding to the second set of the second daltonized images.

6. The device of claim 1, wherein the first daltonized images are indicated by the first identification in metadata and the second set of the second daltonized images are indicated by the second identification in the metadata.

7. The device of claim 6, wherein the first color map is a monochrome map.

8. A device comprising: an image decoder configured to receive a first data stream, the image decoder comprising a circuit configured to provide a first set of first daltonized images using a first color map and a second set of second daltonized images using a second color map generated from the first data stream, wherein at least one of the first set of the first daltonized images are located sequentially in time after a beginning of the second set of the second daltonized images, wherein the image decoder is configured to provide the first daltonized images and the second set of the second daltonized images for display with the first data stream substantially simultaneously on a display communicably coupled to the image decoder, wherein the first daltonized images are associated with a first identification and the second set of the second daltonized images are associated with a second identification, wherein out of order processing of the first daltonized images and the second daltonized images is achieved using the first and second identifications.

9. The device of claim 8, wherein the first data stream comprises source data and metadata and the metadata is used to provide the first color map and the second color map.

10. The device of claim 8, wherein a picture in picture image is provided.

11. The device of claim 8, wherein the image decoder is configured to receive a user input and provide the first color map based on the user input.

12. A device, comprising: an image decoder configured to receive a first data stream, the image decoder configured to provide a first set of first daltonized images using a first color map and a second set of second daltonized images using a second color map from the first data stream, wherein at least one of the first set of the first daltonized images are located sequentially in time after a beginning of the second set of the second daltonized images, wherein the image decoder is configured to provide the first set of the first daltonized images and the second set of the second daltonized images for display on a first display communicably coupled to the image decoder substantially simultaneously with the first data stream or another version of the first data stream, wherein the first daltonized images are associated with an first identification and the second set of the second daltonized images associated with by a second identification, wherein out of order processing of the first daltonized images and the second daltonized images is achieved using the first and second identifications.

13. The device of claim 12, wherein the first data stream is provided from a video source and wherein the first color map is selected in response to a first color characteristic of a first set of first data stream images corresponding to the first daltonized images and the second color map is selected in response to a second color characteristic of a second set of data stream images corresponding to the second set of the second daltonized images.

14. The device of claim 12, wherein the another version is displayed and is another set of daltonized images.

15. The device of claim 12, wherein the first set of the first daltonized images and the second set of the second daltonized images and the another version are displayed on a single display such that entireties of an image form each are displayed.

16. The device of claim 12, wherein the first set of the first daltonized images and the second set of the second daltonized images are displayed on the first display and the another version is displayed on a second display.

17. A device comprising: an image decoder configured to receive a first video stream a first image and associated first metadata, the image decoder comprising a circuit configured to configured to provide a first set of first daltonized images using a first color map and the first metadata and a second set of daltonized images using a second color map and the first metadata, wherein the first color map is selected in response a first color characteristic of a first set of first video stream images corresponding to the first daltonized images and the second color map is selected in response to a second color characteristic of a second set of video stream images corresponding to the second set of the second daltonized images, wherein at least one of the first set of the first daltonized images are located sequentially in time after a beginning of the second set of the second daltonized images, wherein the image decoder is configured to provide the first set of the first daltonized images and the second set of the second daltonized images for display on a first display communicably coupled to the image decoder substantially simultaneously with the first video stream or another version of the first video stream, wherein the first daltonized images are associated with an first identification and the second set of the second daltonized images are associated with a second identification, wherein out of order processing of the first daltonized images and the second daltonized images is achieved using the first and second identifications.

18. The device of claim 17, wherein the first daltonized images and the second daltonized images are displayed in sequential order associated with the first video stream.

19. The device of claim 17, wherein metadata is embedded in the first video stream and is resolvable on a picture-by-picture basis.

20. The device of claim 19, wherein the metadata designates a color map as the first color map.

* * * * *